United States Patent
Tankard et al.

(10) Patent No.: US 8,121,819 B2
(45) Date of Patent: Feb. 21, 2012

(54) DERIVING VALUES OF PARAMETERS IN ELECTRICAL MACHINES

(75) Inventors: Michael Paul Tankard, Harrogate (GB); James Douglas Alexander Chambers, Huntingdon (GB)

(73) Assignee: Nidec SR Drives Ltd., North Yorkshire (GB)

( * ) Notice: Subject to any disclaimer, the term of this patent is extended or adjusted under 35 U.S.C. 154(b) by 560 days.

(21) Appl. No.: 12/270,318

(22) Filed: Nov. 13, 2008

(65) Prior Publication Data

US 2009/0134831 A1     May 28, 2009

(30) Foreign Application Priority Data

Nov. 22, 2007     (GB) .................................. 0722919.8

(51) Int. Cl.
*H02P 6/00*     (2006.01)
(52) U.S. Cl. ....................................................... 702/189
(58) Field of Classification Search .................... 702/189
See application file for complete search history.

(56) References Cited

U.S. PATENT DOCUMENTS

| 6,756,757 B2 * | 6/2004 | Marcinkiewicz et al. .... 318/432 |
| 2003/0218444 A1 * | 11/2003 | Marcinkiewicz et al. .... 318/727 |

FOREIGN PATENT DOCUMENTS

EP     0 573 198 B1     11/1996

OTHER PUBLICATIONS

Alexei Pavlov and Alex Zaremba, Adaptive Observers for Sensorless Control of an Induction Motor, Proceedings of the American Control Conference, Arlington, VA Jun. 25-27, 2001, p. 1557-1562.*

F.R. Salmasi, Dual Estimators for Position and Current Sensorless SRM Drives Based on the Decomposed Model, IEEE, 0-7803-8987-5/05, 2005, pp. 1103-1107.

* cited by examiner

*Primary Examiner* — Tung S Lau
(74) *Attorney, Agent, or Firm* — Haynes and Boone, LLP (57) ABSTRACT

An electrical drive system includes an electrical machine controlled by an electronic controller and requires control signals representing quantities associated with the operation of the electrical machine. These signals may represent, for example, rotor position and flux or current. A controller includes an estimation routine to use the known magnetic characteristics of the machine and a rotor position signal to provide an estimate of current or of supply voltage.

12 Claims, 7 Drawing Sheets

DERIVING VALUES OF PARAMETERS IN ELECTRICAL MACHINES

This invention relates to deriving values of parameters in electrical machines. Particularly, but not exclusively, the invention relates to the estimation of current, voltage or flux in a brushless electrical machine.

In the last three decades, the availability of easily controlled semi-conductor switches has enabled electronic control of many types of electrical machine and hence has provided drive systems whose speed is controlled by the user, rather than by the frequency of the electrical supply. All of these controllers rely, to a greater or lesser extent, on control signals which represent parameters of the machine. The parameters chosen for use are dictated not only by the application but also by the type of electrical machine being controlled, since different types of machines require different control methods, and by the cost of providing these signals.

Figure 1:
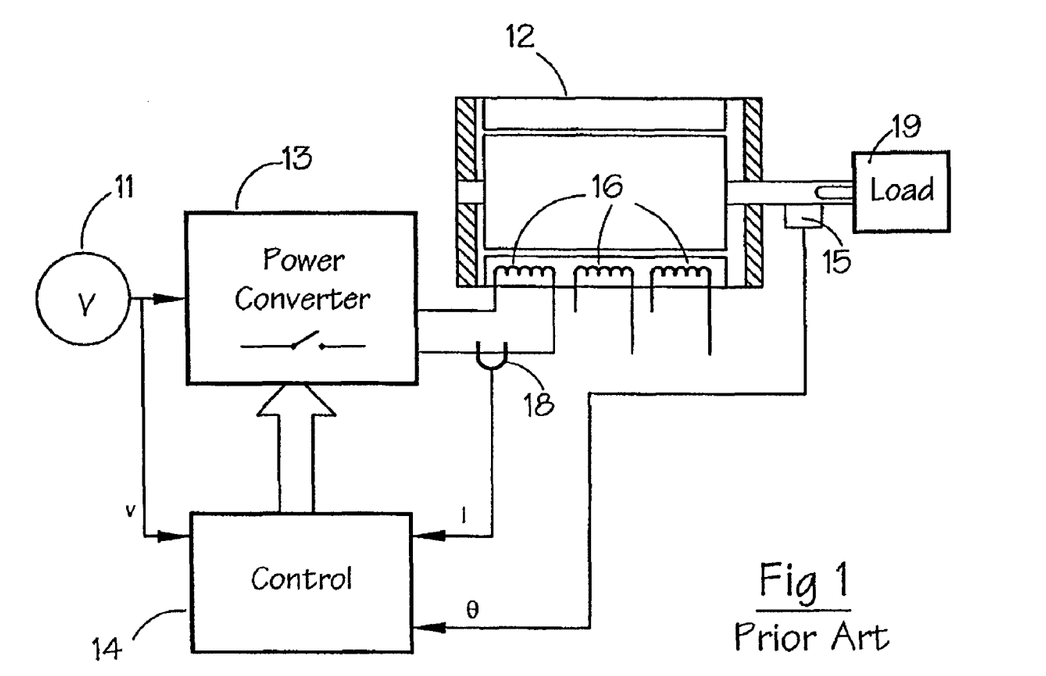
FIG. 1 shows a typical prior art switched reluctance drive.

One type of brushless machine is the switched reluctance machine, which typically forms the basis of a variable-speed drive system. FIG. 1 of the drawings shows a typical polyphase (in this case 3-phase) switched reluctance drive in schematic form, where the switched reluctance machine 12 is connected to a load 19. Single-phase machines are also known. The input DC power supply 11 can be either a battery or rectified and filtered AC mains. The DC voltage provided by the power supply 11 (referred to as supply or DC link voltage below) is switched across the phase windings 16 of the machine 12 by a power converter 13 under the control of the electronic control unit 14. As with other forms of brushless machine, the switching must be correctly synchronised to the angle of rotation of the rotor for proper operation of the drive, and a rotor position transducer 15 may be employed to supply signals corresponding to the angular position of the rotor, $\theta$.

Figure 2:
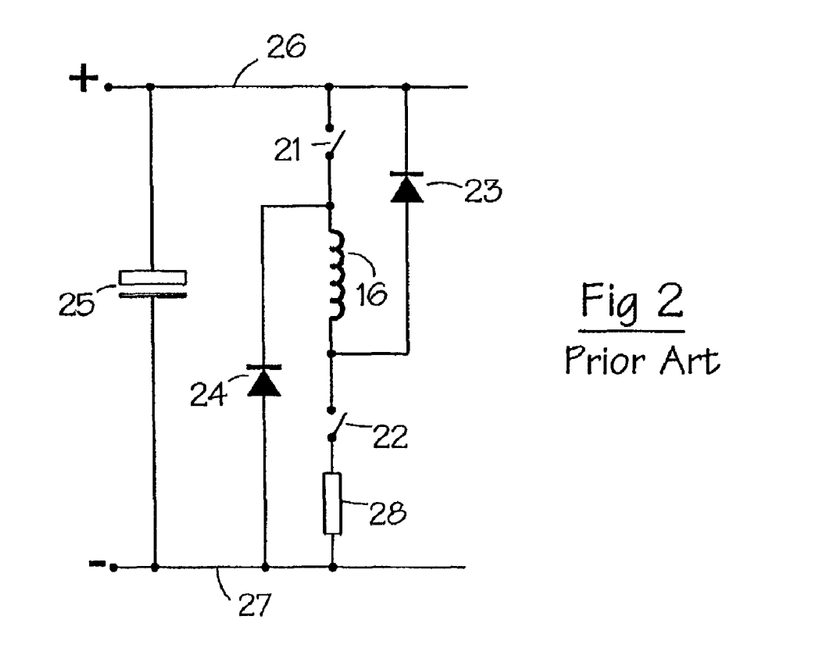
FIG. 2 shows a known topology of one phase of the power converter of FIG. 1.

Many different power converter topologies are known, one of which is shown for a single phase of a polyphase system in FIG. 2, where the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link.

Current feedback from the machine to the converter is generally considered essential for safe operation of the controller, and a number of techniques are known in the art. In FIG. 2, a resistor 28 is connected in series with the lower switch 22 to provide a signal proportional to switch current in the form of a voltage drop across the resistor. Similar arrangements can place the resistor in other parts of the circuit to give measurements of slightly different currents, but none of these provides a signal which is electrically isolated from the main converter circuit. A further disadvantage of such schemes is that, particularly in more powerful machines, the power loss in the resistor becomes significant. Alternatively, an isolated form of current transducer, as shown schematically at 18 in FIG. 1, can be used to provide a signal which is generally easier to use in the control system, but is considerably more expensive and may introduce problems associated with lack of bandwidth. Increasing the bandwidth of the transducer may be possible, but will increase the cost of the transducer.

In addition to current feedback, it is usual to provide a signal corresponding to the voltage of the DC link, as shown in FIG. 1. This can be required for several reasons, e.g. for soft-starting the converter, for device protection, for determining the appropriate switching angles, etc. This signal is frequently provided from a voltage divider comprising a chain of resistors across the DC link. While this is simple and economical, it does not provide an isolated signal to the control circuit. Where complete isolation is required (e.g. for user safety), a more complicated circuit is implemented, normally using opto-isolating devices. While effective, these are much more expensive than the simple resistor chain.

Figures 3A, 3B:
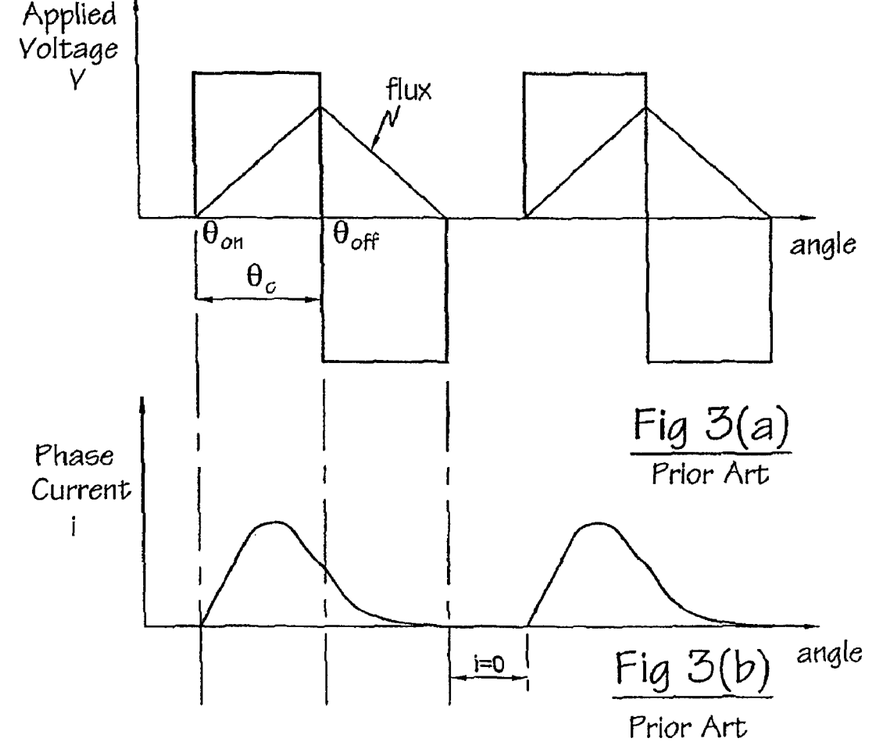
FIG. 3 shows typical voltage, flux and current waveforms for a switched reluctance machine.

FIG. 3 shows successive cycles of the circuit shown in FIG. 2. In FIG. 3(a) the voltage is applied to the phase winding for the duration of the conduction angle $\theta_c$ when the switches 21 and 22 are closed at the rotor angle $\theta_{on}$ and opened at the angle $\theta_{off}$. The flux, which is the time integral of the applied voltage, rises almost linearly while the voltage is applied. The current in the phase winding 16 rises to a peak and then, depending on the operating point, falls. At the end of the conduction period, the switches are opened and the current transfers to the diodes, placing the inverted link voltage across the phase winding and hence forcing down the flux and the current to zero. At zero current, the diodes cease to conduct and the circuit is inactive until the start of a subsequent conduction period.

In recent years, there has been a trend towards eliminating the rotor position transducer and several methods of "sensorless" position estimation have evolved. Many of these methods favour the use of parameters representing the phase current and flux. For example, phase flux-linkage (i.e. the integral of applied voltage with respect to time) and current (e.g. measured by current transducer 18 in FIG. 1 or by resistor 28 in FIG. 2) in one or more phases can be monitored. Position is then calculated using knowledge of the variation in inductance of the machine as a function of angle and current. One particularly efficient method is described in EP 0573198 (Ray), which is incorporated herein by reference.

It has been the general view in industry that electrical drive systems should move from rotor position transducers, which were typical of early versions of variable speed drives, to sensorless solutions. However, such sensorless systems provide position estimates which are only as good as the voltage and current feedback signals used in the algorithms. In some systems, particularly low-voltage, high-current systems, a significant part of the cost of the overall drive is attributed to the current feedback signals. Similarly, high-voltage systems need robust methods of providing a galvanically isolated signal representing the supply voltage to the controller.

Some applications for electrical machines (e.g. for automotive use) require operation from a relatively low supply voltage, typically less than 50V. Thus, even though the output power requirement may only be a few kilowatts, the current requirement is of the same order as would be found in much larger drives operating from higher voltages. By way of example, a machine operating from a nominal 12V supply and developing 4 kW will require over 400 A from the supply. A current transducer for the phase windings for this application would require to be rated around 500 A peak and, if the current signal is to be used in a position estimation algorithm, would also require to have a high bandwidth. Hence the total cost of the transducers (e.g. three transducers for a 3-phase system) would represent a significant fraction of the cost of the power and control electronics for the entire drive system.

There is therefore a need to provide a cost-effective scheme for deriving parameter information in such electrical machine drive systems. The present invention is defined in the accompanying independent claims. Some preferred features are recited in the dependent claims.

According to one embodiment, there is provided a method of deriving a value of a parameter in an electrical machine, such as an electric or magnetic parameter of the machine. The method includes obtaining a position signal representative of rotor position of a rotor of the machine relative to a stator of the machine using a rotor position transducer and using this position signal to derive a value of the parameter from a relationship between the parameter and rotor position based on the magnetic characteristics of the machine.

The parameter may be the phase current in the or a phase of the machine, which may be derived using the rotor position and a further signal representative of flux linkage. The flux linkage signal may be derived using a voltage transducer to measure the supply or DC link voltage.

The parameter may be the flux linkage or supply voltage of the or a phase of the machine and may be derived using the rotor position and a further signal representative of the phase current in the phase obtained using a current transducer.

The above methods allow one of the current transducers (one for each phase in a polyphase system) and voltage transducers of the machine to be effectively replaced by a rotor position transducer which can be used together with the other one or ones of the transducers and knowledge of the magnetic characteristics of the machine to derive a value for the relevant parameter. This is contrary to the present thinking in the art which seeks to dispense with the rotor position transducer by using measured phase current and voltage signals to estimate rotor position. However, the present inventors have realised that under certain circumstances, using a rotor position transducer to dispense with one of the current transducers or the voltage transducer can result in cost savings where the cost of the rotor position transducer is less than the cost of the current transducers or voltage transducer.

The relationship defined by the magnetic characteristic could be stored in a look-up table in one specific implementation. Where a value of phase current is derived from rotor position and flux linkage, a value for flux linkage may be calculated by integrating a measured voltage and a stored representation of a previously derived value of phase current. A value of supply or DC link voltage may be derived from a value of flux linkage by differentiation with respect to time. The value of flux linkage may be derived from measured current and rotor position values and the knowledge of the magnetic characteristics of the machine.

The invention is suited to any electrical machine with one or more separately excitable phases. It is particularly useful in a switched reluctance machine.

The invention can be put into practice in a number of ways, some of which will now be described by way of example and with reference to the accompanying drawings in which.

In the following exemplary embodiments, the term "position transducer" is used to denote a physical piece of hardware which gives as an output a physical, for example optical, electrical or other signal representative of the position of the moveable part of an electrical machine. In a rotating machine, the signal will represent angular position of the rotor: in a linear machine, the signal will represent linear displacement of the translator. For example, for a rotating machine, the position transducer could be a resolver, an encoder, or a low-resolution optical or magnetic device, all as well-known in the art of position control. An example of a resolver is a Smartsyn® TS2605N1 from Tamagawa Seiki Ltd. By contrast, the term "position estimation algorithm" denotes a set of mathematical relationships which have been coded into software which, when supplied with the appropriate input signals, produces an output representing an estimate of position. The position estimation algorithm does not include any hardware.

In particular, a position transducer, such as the rotor position transducer 15, includes a first portion associated with the moveable part of the machine, such as a rotor, and a second portion associated with the stationary part of the machine, such as the stator. The first portion influences an output of the second portion as it moves, together with the moveable part, relative to the second portion. The output may be representative of the absolute position of the moveable part relative to the stationary part or may be representative of relative movement between the two parts. The output may be influenced by any physical coupling between the two portions, for example optical (transmissive or reflective), electrical (for example capacitive) or magnetic (for example based on the Hall effect).

It has been found by the present inventors that, in particular where the combined cost of the current transducers used for position estimation exceeds the cost of a single position transducer, there may be little economic benefit in using sensorless position detection and, consequently, that the use of a position transducer could represent an overall cost saving if some other provision could be made for providing current information to the drive to ensure its correct operation.

Figure 4:
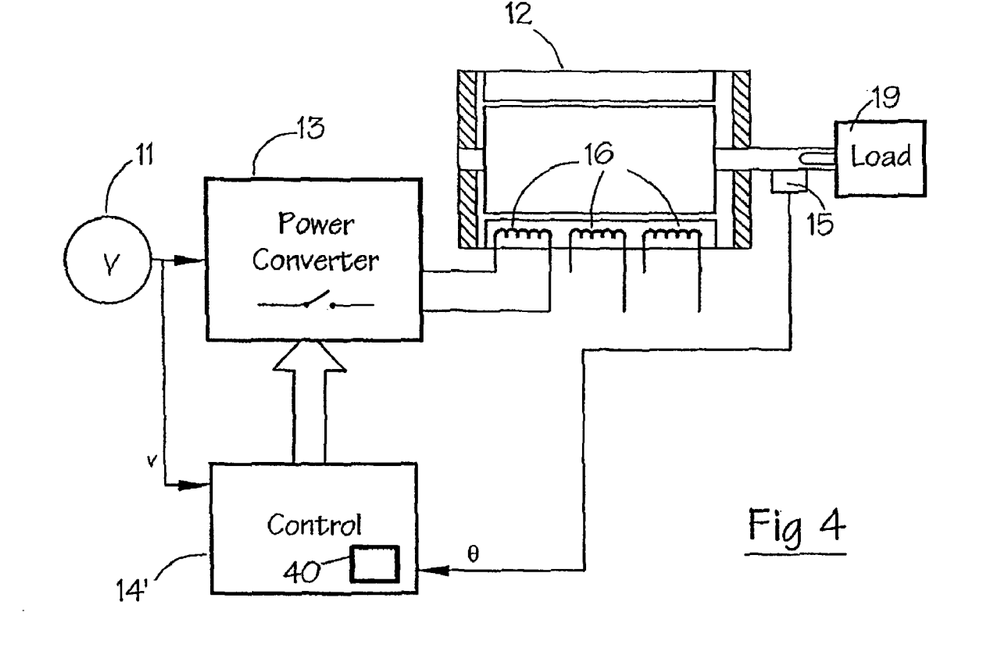
FIG. 4 shows a schematic diagram of an electric drive system according to a disclosed embodiment.

An embodiment is shown schematically in FIG. 4. Like parts common to FIG. 1 have been labelled accordingly. It will be noted that FIG. 4 has no current transducers but has a current estimation algorithm 40 included in the control system 14'. As described above, the position transducer 15 may be any suitable hardware device which measures the angular position of the rotor and provides a suitable signal to the control system 14'.

The current estimation algorithm takes as its inputs the position $\theta$ and the flux linkage $\psi$. The flux linkage is given by the time integral of the phase voltage over the conduction period, ie $$\psi = \int_0^{\theta_{cond}} v - iR \, dt \quad (1)$$

At the start of the integration cycle (the start of the conduction period), the current is known to be zero, so the correct value for phase current i can be inserted in Equation 1. As the integration progresses, the current is estimated (as described below), so the last available estimated current value can be inserted in the equation. Since the voltage drop across the phase winding (the iR term in Equation 1) is generally much smaller than the phase voltage (v), this is an acceptable approximation.

Figure 5:
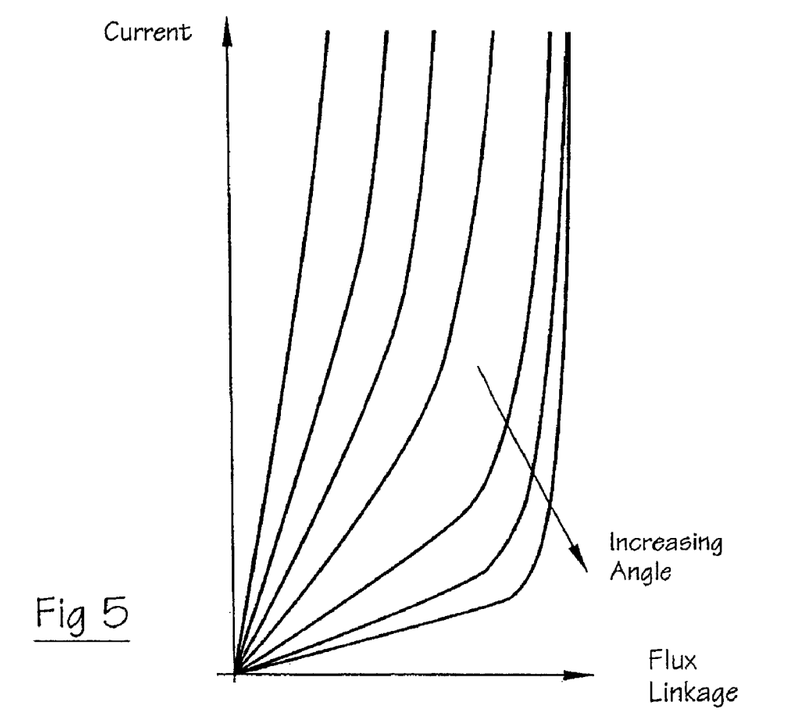
FIG. 5 shows the relationship between current, flux-linkage and position for a doubly salient electrical machine.

Given the flux linkage and the rotor position, the current estimation algorithm can provide a current estimate by reference to the magnetic characteristics of the machine. For example, for a magnetically doubly salient machine, there is a unique relationship between the flux linkage, position and current, as shown in FIG. 5. The data represented by FIG. 5 can be held in one or more tables, each vector of data being indexed by rotor angle and flux-linkage. By accessing the table with known values of angle (from the position transducer) and flux-linkage (from Equation 1 above), the current can be estimated.

The value of current thus found can be used in the control of the drive system in the same way as if it had been provided by a current transducer. For example, the method can be applied simultaneously to each of the phases of a polyphase drive system and the currents thus estimated can be combined (taking account of the correct phase shift and direction of flow) to give an estimate of the DC link current and/or the supply current.

The solution of Equation 1 must be done at a rate appropriate to the required response of the control system. Typically, the most demanding requirement for the current control aspects of the machine would be when a fault occurs and the controller has to shut the system down before damage is caused to, e.g., the power devices. This would imply a cycle time of 50 μsec for the solution of Equation 1 and look-up of the tables. However, in small and low-voltage systems, the per-unit resistance of the machine is generally high, and may allow the system to be "resistively limited", i.e., the resistance of the phase winding is sufficient to limit the current to a value which does not cause distress to the power devices. This fact relaxes the requirement for high bandwidth in the controller and makes this embodiment particularly suitable for low-voltage, high-current drive systems.

Figure 6:
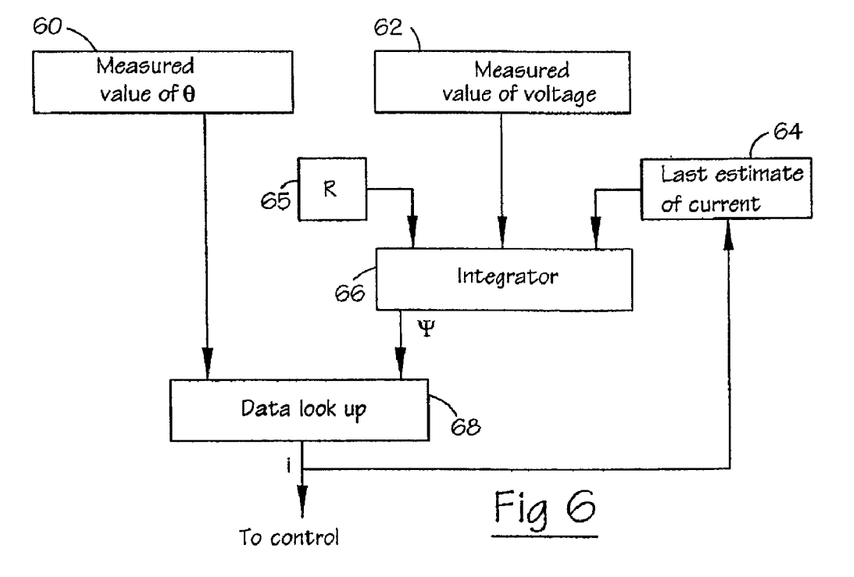
FIG. 6 shows a block diagram relating to the embodiment shown in FIG. 4.

FIG. 6 is a block diagram schematically showing components used in the method described above. The position signal from the rotor position transducer 15 is decoded as necessary and stored in an appropriate register 60. The voltage on the DC link is sampled and stored in an appropriate register 62. A further register 64 holds the last computed value of current. At the start of the phase cycle the current is zero and the register 64 is set to zero. The register 64 is updated at the end of each iteration of the method. A yet further register 65 holds the value of phase resistance R. This value can be fixed or can be made to vary with, for example, the temperature of the phase winding. An integrator 66 integrates V-iR using the values of the registers 62, 64 and 65. There are many integration methods which are suitable, e.g. trapezoidal, Runge-Kutta, etc, all as well-known to those skilled in numerical integration.

The output of the integrator 66 represents the derived value of flux-linkage which, together with the value of rotor position available from register 60, form the data inputs to look up table (or other data representation) 68. The inputs are used to interrogate the data (shown graphically in FIG. 5) to produce the required value of current. Again, there are many different methods of storing, interrogating and interpolating the data in numerical or functional form, all well-known in the art, which could be employed to produce the required result. The value of current is then available for use in the control system, and can be used to update the register at 64. The estimation routine is then begun again, so that a continuously updated value of current is available.

Figure 10:
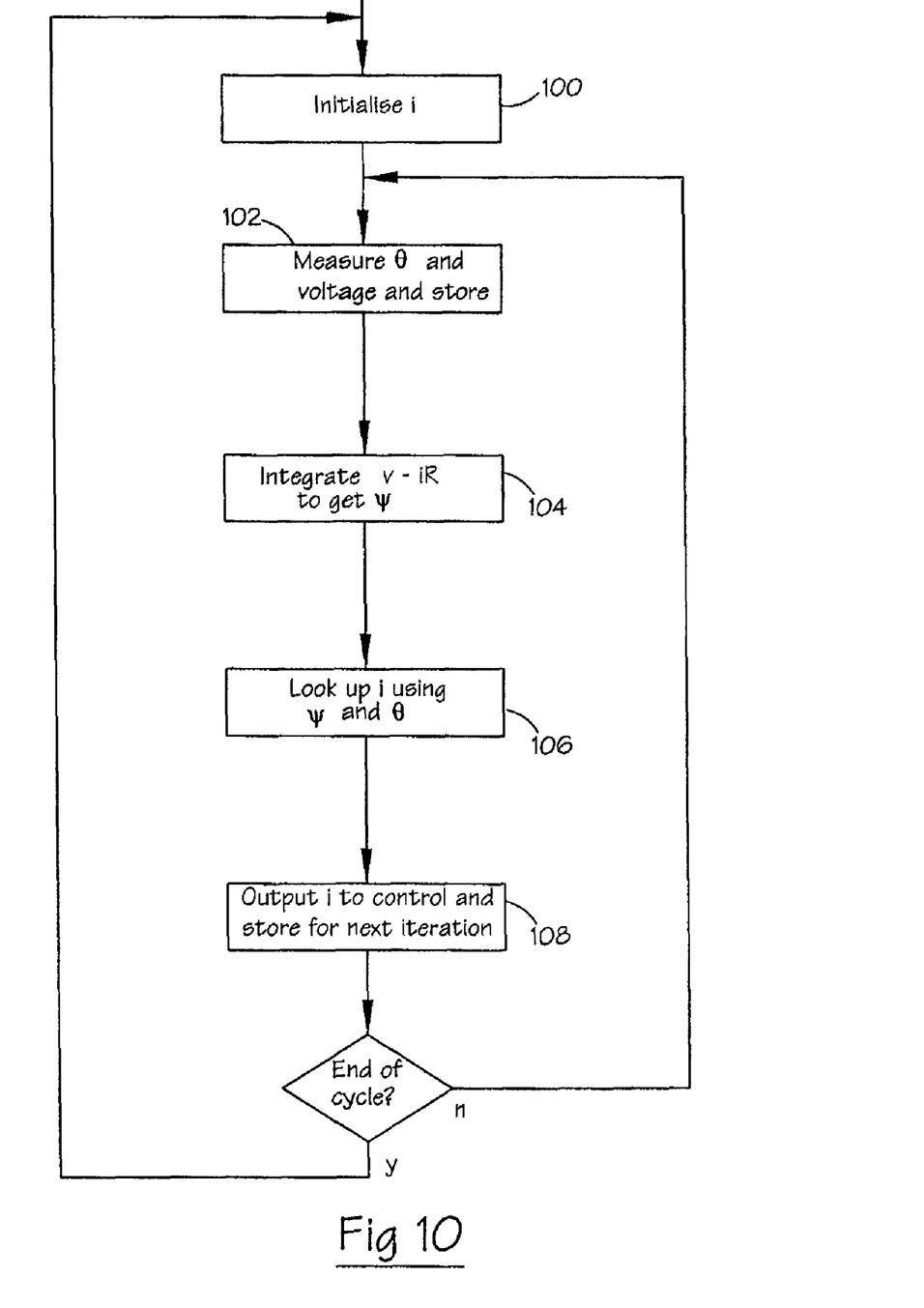
FIG. 10 shows a flowchart relating to the embodiment shown in FIG. 4.

FIG. 10 shows a flowchart illustrating method steps for deriving the value of phase current i according to the method described above. At step 100, the current is initialised to zero at the beginning of a phase cycle. It will be understood that i may also be initialised to a suitably derived non-zero value if the machine operates in continuous current mode. At step 102 measured values are obtained for θ and the voltage and at step 104 V-iR is integrated to find a value for flux linkage ψ. At step 106 the values for θ and ψ are used to find a value for phase current i. At step 108 the value of i is made available to the control system and is also stored for the next iteration. Then, after step 108 the method loops back to step 102. Once the end of the phase cycle is reached, the method loops back to step 100 and is ready for the next phase cycle.

Figure 7:
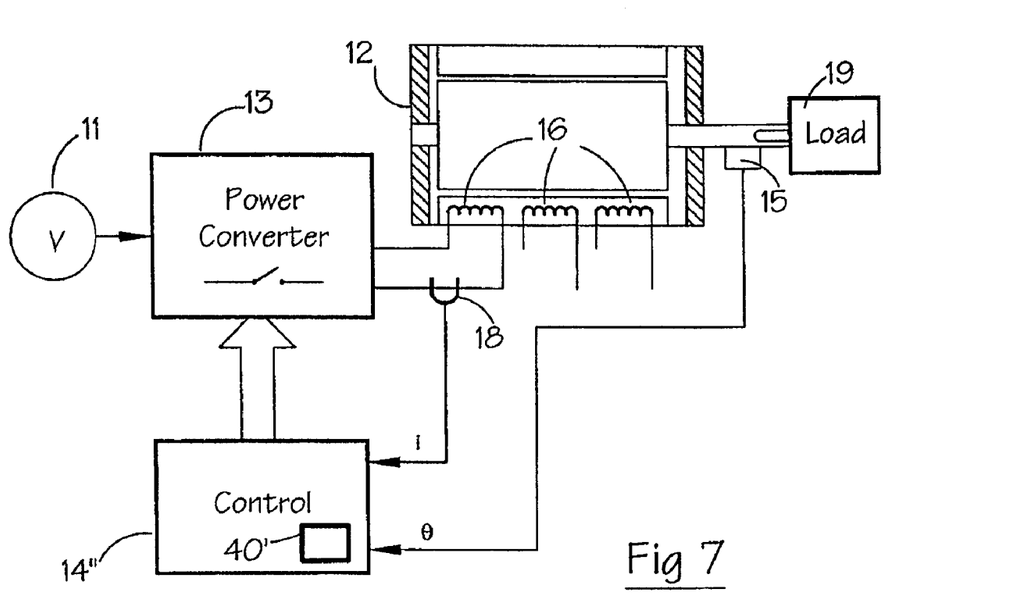
FIG. 7 shows a schematic diagram of an electric drive system according to a further disclosed embodiment.

FIG. 7 shows another embodiment. It is similar to FIG. 4 except that there is no voltage feedback from the DC link to the controller 14". Rather, the controller receives phase current feedback from current transducer(s) 18. The controller 14" has a voltage estimation algorithm 40' embedded in it. In use, the rotor position transducer 15 provides the required position signals, and the current transducer(s) 18 provide(s) information on phase current. If the current transducer 18 is an isolated device (e.g. a Hall-effect or flux-nulling device), then the inputs to the control system can be completely isolated from the high-voltage DC link.

Figure 8:
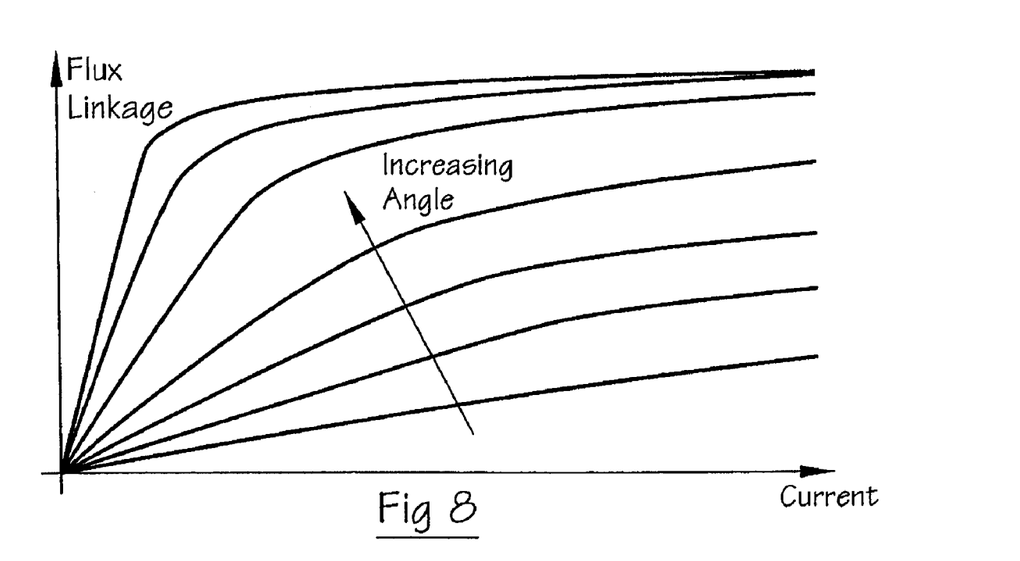
FIG. 8 shows the flux-linkage curves for a doubly salient electrical machine.

The magnitude of the supply voltage can be obtained from the current signal, the rotor position signal and the magnetic characteristics of the machine. FIG. 8 shows the characteristics of a doubly salient machine in a suitable form, where flux-linkage is shown as a function of phase current and rotor position. As with the previous embodiment, this data can be held in one or more look-up tables. Here, the data is indexed by rotor position and current, allowing flux-linkage to be found using any of the well-known interpolation methods for data management. Knowing the flux-linkage, rotor angle and current, Equation 1 can be used to yield the value of v, the supply voltage, by evaluating v=dψ/dt+iR. The rate of change dψ/dt can be estimated by: differencing stored previously derived values of flux-linkage; a stored value and the currently estimated value of flux-linkage; or any one of the many approaches known for numerically calculating a rate of change of a signal.

In addition, or alternatively, the flux-linkage signal can be used directly as one of the control signals of a flux controller for the machine. Since the torque output of the machine is more directly related to the flux than to the current, a flux controller is sometimes preferred to a current controller in order to achieve close control of the torque. This embodiment is suited to such a controller.

This embodiment does not require a very high bandwidth in the controller, since the DC link voltage will only vary slowly in response to external disturbances. Its main advantage is that complete voltage isolation from the DC link is provided, making this embodiment particularly appropriate to high-voltage systems, where the prior art methods of isolation are cumbersome and expensive.

Figure 9:
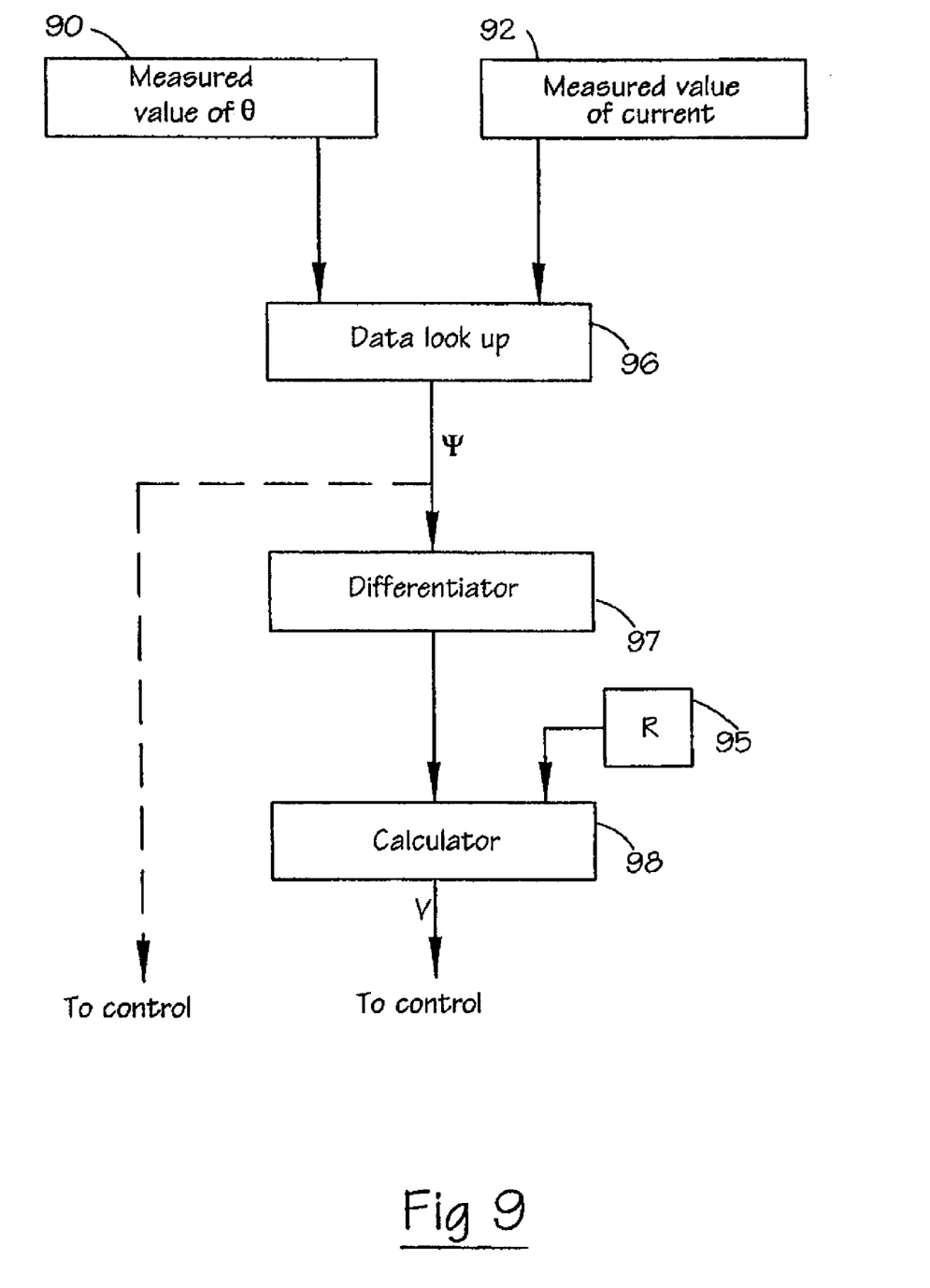
FIG. 9 shows a block diagram relating to the embodiment shown in FIG. 7.

FIG. 9 is a block diagram schematically showing components used in the method described above in relation to FIGS. 7 and 8. The position signal from the rotor position transducer 15 is decoded as necessary and stored in an appropriate register 90. The phase current is sampled and stored in an appropriate register 92. A further register 95 holds the value of phase resistance R. This value can be fixed or can be made to vary with, for example, the temperature of the phase winding. The values of registers 90 and 92 form the inputs to the data look up table (or other data interrogating means) 96. The inputs are used to interrogate the data (shown graphically in FIG. 8) to produce the required value of flux-linkage. Again, there are many different methods of storing, interrogating and interpolating the data, all well-known in the art, which could be employed to produce the required result. The value of flux-linkage ψ is then available for use in the control system, if required for flux control. This is indicated by the dashed arrow in FIG. 9.

A differentiator 97 differentiates $\psi$ to obtain $d\psi/dt$. Many differentiation methods are suitable, all as well-known to those skilled in numerical differentiation. A calculator 98 calculates $(d\psi/dt+iR)$ to give a value of supply voltage V. This value is now available to the control system in same way that a measured value could have been used. The estimation routine is then begun again, so that a continuously updated value of voltage is available. It will be understood that the differentiator 97, the further register 95 and the calculator 98 are not required if the value of V is not needed for control, for example if control is based directly on flux linkage $\psi$.

Figure 11:
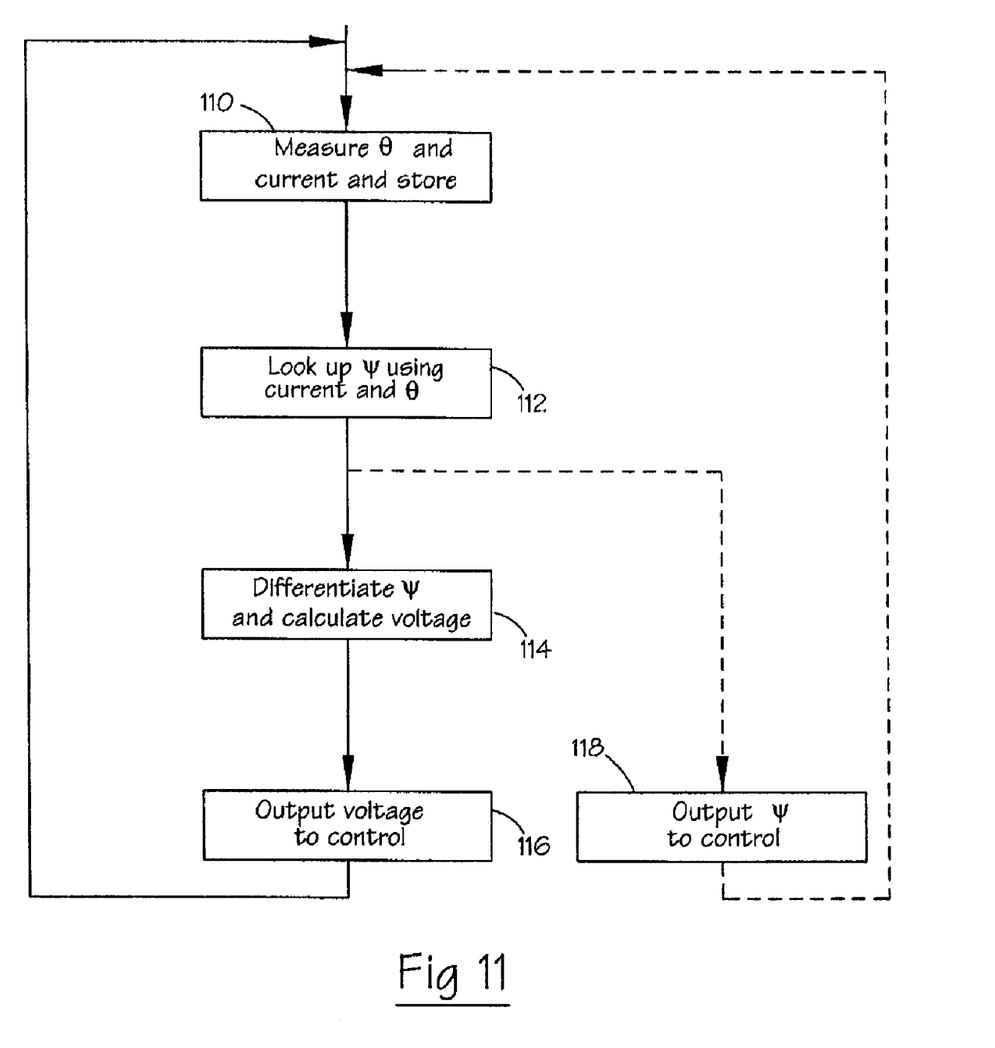
FIG. 11 shows a flowchart relating to the embodiment shown in FIG. 7.

FIG. 11 shows a flowchart illustrating method steps of the method described above in relation to FIGS. 7, 8 & 9. At step 110 values for $\theta$ and current are measured and stored and then used at step 112 to look up (or otherwise determine) a value for flux linkage $\psi$. This value is then differentiated and used to calculate a value for the phase voltage at step 114 which is output for use in controlling the machine at step 116. As described above, some control schemes use a flux linkage signal for control. For use with such control schemes, an alternative step 118 of outputting the value for flux linkage $\psi$ for use in controlling the machine may follow step 112. After step 116 or 118, as the case may be, the method loops back to step 110 and begins a further iteration.

The skilled person will appreciate that the invention may be applied with equal benefit to machines operating as motors or as generators and to machines with one or more phases, and that variations of the disclosed arrangements are possible without departing from the invention, particularly in the details of the implementation of the algorithms in the controller. It will also be apparent that, while the technique has been described in relation to a switched reluctance machine, it can be used in relation to any machine with independently supplied phases. Also, while the invention has been described in terms of a rotating machine, the invention is equally applicable to a linear machine having a stator in the form of a track and a moving part moving on it. The word "rotor" is used in the art to refer to the movable part of both rotating and linear machines and is to be construed herein in this way. Accordingly, the above description of several embodiments is made by way of example and not for the purposes of limitation. It will be clear to the skilled person that minor modifications can be made to the control method without significant changes to the operation described above. The present invention is intended to be limited only by the scope of the following claims.

What is claimed is:

1. A method of deriving a value of flux linkage in a switched reluctance machine, the switched reluctance machine including a rotor and a stator and having magnetic characteristics defining a relationship between flux linkage, current, and rotor position, the method comprising:
    obtaining, from a rotor position transducer, a position signal representative of rotor position;
    obtaining, from a current transducer, a current signal; and
    deriving, using a controller, the value of flux linkage in a phase based on the position signal, the current signal, and the relationship.

2. A method as claimed in claim 1 in which deriving the value includes accessing a look-up table with the position signal and the current signal to derive the value.

3. A method as claimed in claim 1 including deriving a value of supply voltage from the derived value of flux-linkage.

4. A method as claimed in claim 1 in which the rotor position transducer includes a first portion associated with the rotor and a second portion associated with the stator, one of the two portions being arranged to influence the other one to produce an output representative of position or movement relative to the stator of the rotor.

5. A method as claimed in claim 3 including deriving a rate of change of flux-linkage using the estimated value of flux-linkage and deriving the value of supply voltage as a function of the rate of change.

6. A system for deriving a value of flux linkage in a switched reluctance machine, the switched reluctance machine including a rotor and a stator and having magnetic characteristics defining a relationship between flux linkage, current, and rotor position, the system comprising:
    a rotor position transducer for obtaining a position signal representative of rotor position;
    a current transducer for obtaining a current signal;
    means for storing data representative of the relationship; and
    means for deriving the value of flux linkage in a phase based on the position signal, the current signal, and the data.

7. A system as claimed in claim 6, which includes means for interrogating the data with the position signal and the current signal to derive the value of flux linkage.

8. A system as claimed in claim 6, which includes means for deriving a value of supply voltage from the derived value of flux-linkage.

9. A system as claimed in claim 6 in which the position transducer includes a first portion associated with the rotor and a second portion associated with the stator, one of the two portions being arranged to influence the other one to produce an output representative of position or movement of the rotor relative to the stator.

10. A system as claimed in claim 8, which includes means for deriving a rate of change of flux-linkage using the estimated value of flux-linkage and deriving the value of supply voltage as a function of the rate of change.

11. A system for deriving a value of voltage in a switched reluctance machine, the switched reluctance machine including a rotor and a stator and having magnetic characteristics defining a relationship between flux linkage, current, and rotor position, the system comprising:
    a rotor position transducer for obtaining a position signal representative of rotor position;
    a current transducer for obtaining a current signal;
    means for storing data representative of the relationship; and
    means for deriving the value of voltage in a phase based on the position signal, the current signal, and the data.

12. A non-transitory digitally readable medium encoded with program code instructions which, when run on a processor, implement a method of deriving a value of flux linkage in a switched reluctance machine, the switched reluctance machine including a rotor and a stator and having magnetic characteristics defining a relationship between flux linkage, current, and rotor position, the method comprising:
    obtaining, from a rotor position transducer, a position signal representative of rotor position;
    obtaining, from a current transducer, a current signal; and
    deriving the value of flux linkage in a phase based on the position signal, the current signal, and the relationship.

* * * * *